(12) United States Patent
Smith

(10) Patent No.: US 11,755,579 B2
(45) Date of Patent: Sep. 12, 2023

(54) DATABASE SYSTEM WITH RUN-TIME QUERY MODE SELECTION

(71) Applicant: Cysiv, Inc., Dallas, TX (US)

(72) Inventor: Daniel James Smith, Ottawa (CA)

(73) Assignee: Cysiv, Inc., Dallas, TX (US)

( * ) Notice: Subject to any disclaimer, the term of this patent is extended or adjusted under 35 U.S.C. 154(b) by 18 days.

(21) Appl. No.: 17/394,131

(22) Filed: Aug. 4, 2021

(65) Prior Publication Data
US 2023/0042738 A1    Feb. 9, 2023

(51) Int. Cl.
*G06F 16/22* (2019.01)
*G06F 16/2453* (2019.01)
*G06F 16/2458* (2019.01)
*G06F 16/25* (2019.01)

(52) U.S. Cl.
CPC ........ *G06F 16/24549* (2019.01); *G06F 16/22* (2019.01); *G06F 16/2471* (2019.01); *G06F 16/256* (2019.01)

(58) Field of Classification Search
CPC ........... G06F 16/24549; G06F 16/2471; G06F 16/22; G06F 16/256
See application file for complete search history.

(56) References Cited

U.S. PATENT DOCUMENTS

| 6,330,552 | B1 * | 12/2001 | Farrar | ........... | G06Q 10/04 707/999.001 |
|---|---|---|---|---|---|
| 10,789,231 | B2 | 9/2020 | Suarez et al. | | |
| 2007/0038618 | A1 | 2/2007 | Kosciusko et al. | | |
| 2012/0233157 | A1 | 9/2012 | Mohajer | | |
| 2015/0019877 | A1 | 1/2015 | Dayka et al. | | |
| 2017/0116343 | A1 * | 4/2017 | Wu | ........... | G06F 21/6209 |
| 2020/0110905 | A1 * | 4/2020 | O'Cleirigh | ........... | G06F 21/51 |
| 2020/0219028 | A1 * | 7/2020 | Papaemmanouil | .. | G06Q 20/145 |
| 2021/0042310 | A1 * | 2/2021 | Frantz | ........... | G06F 16/283 |

FOREIGN PATENT DOCUMENTS

CN    105787119 B    6/2020

OTHER PUBLICATIONS

International Search Report and Written Opinion, Patent Cooperation Treaty Application No. PCT/IB2022/055732, dated Sep. 22, 2022, 11 pages.

* cited by examiner

*Primary Examiner* — Jorge A Casanova
(74) *Attorney, Agent, or Firm* — Womble Bond Dickinson (US) LLP

(57) ABSTRACT

A query is received from a client device and a mode is selected to process the query from a set of possible modes. The possible modes include a fast mode and a low-cost mode. If the fast mode is selected, the query is forwarded to a cloud database to retrieve responsive records. If the low-cost mode is selected, the cloud database is queried for index metadata of responsive records and the index metadata is used to retrieve the responsive records from a datastore other than the cloud database. Regardless of the mode selected, the responsive records are provided to the client device.

20 Claims, 5 Drawing Sheets

DATABASE SYSTEM WITH RUN-TIME QUERY MODE SELECTION

BACKGROUND

1. Technical Field

The subject matter described relates generally to databases and, in particular, to selecting a query mode to access data at run-time.

2. Background Information

In recent years there has been much written about the rapid increase in the amount of data businesses and other entities are generating and storing. With the ready availability of scalable cloud storage, storing data is relatively cheap. However, processing that data to obtain useful information can be significantly more expensive and often involves significant expertise. For example, a network security application might generate massive log files describing all of the network traffic for an enterprise. But analyzing those log files to identify and neutralize specific security threats requires understanding how network traffic associated with an attack can be distinguished from benign network activity. As another example, in a pharmaceutical company may have petabytes of clinical trial data including levels of numerous biomarkers for a large number of patients with different demographics. But processing the clinical trial data to determine actionable treatment plans requires controlling for a large number of variables to ensure that observed correlations have a causal connection, and how any connection identified can be leveraged to provide treatment.

SUMMARY

Historically, an enterprise (or other entity) would store its own data. Storage was expensive because adding capacity meant the enterprise obtaining and maintaining additional hardware. But once storage was obtained, the cost of querying stored data was negligible. Thus, query techniques developed that can rapidly parse large amounts of data and identify responsive results. However, the advent of scalable cloud-based storage has changed that paradigm. With cloud-based systems, adding additional storage capacity is relatively cheap, but there is typically a cost associated with querying data. Furthermore, the cost is often per byte that might be touched or returned by a query. For example, SELECT*FROM logs where hostname="myhost" will charge for every byte in the logs table, even if there is not a single record with the hostname "myhost."

This and other problems may be addressed by a database management system and method (as well as a computer-readable medium storing instructions for performing the method) that provide run-time selection between query modes. In various embodiments, a query is received from a client device and a mode is selected to process the query from a set of possible modes. The possible modes include a fast mode and a low-cost mode. The query is processed according to the selected mode to generate results and the results are provided to the client device.

In one embodiment, the fast mode involves forwarding the query to a cloud database and receiving the results from the cloud dataset. In contrast, the low-cost mode involves querying the cloud database for index metadata of responsive records. The index metadata of a responsive record may include a path indicating a file in a datastore (other than the cloud database) that includes the responsive record and an offset indicating the location of the responsive record within the file. Thus, the cost of retrieving the entire content of the responsive records from the cloud database may be alleviated.

The low-cost query mode may be enabled by a data ingestion process that stores records in both the cloud database and the datastore. In one embodiment, the data ingestion process includes receiving data from one or more data sources and generating records based on the received data. The records are added to a record file. Index metadata (e.g., paths and offsets) is also added to the records. The record file is saved to the datastore and the records in the record file are loaded into a table in the cloud database.

DETAILED DESCRIPTION

The figures and the following description describe certain embodiments relating to storing and querying log data by a network security application by way of illustration only. One skilled in the art will readily recognize from the following description that alternative embodiments of the structures and methods may be employed without departing from the principles described. In particular, the described techniques may be used in a wide range of scenarios where a large amount of data is stored in a single table. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Example Systems

Figure 1:
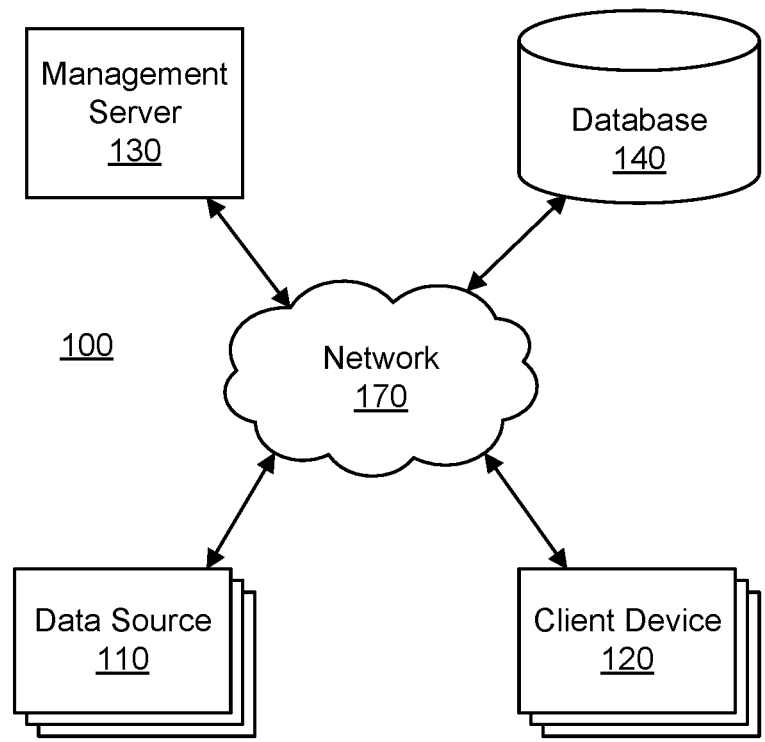
FIG. 1 is a block diagram of a networked computing environment suitable for providing database access with run-time query mode selection, according to one embodiment.

FIG. 1 illustrates one embodiment of a networked computing environment 100 suitable for providing database access with run-time query mode selection. In the embodiment shown, the networked computing environment 100 includes one or more data sources 110, one or more client devices 120, a management server 130, and a cloud database 140, all connected via a network 170. In other embodiments, the networked computing environment 100 includes different or additional elements. In addition, the functions may be distributed among the elements in a different manner than described. For example, although the management server 130 is depicted as a single entity for convenience, the functionality described below may be split between two or more devices (e.g., one computing device may gather and store data in the cloud database 140 while another computing device may handle queries of the stored data).

A data source 110 is a computing device that generates or provides data to be stored in the database cloud 140. In one embodiment, the data sources 110 include computing devices in an enterprise network. The computing devices generate telemetry data (e.g., processes executing, network connections opened, IP addresses and ports communicated with, numbers of packets sent, etc.) and send the telemetry data to the management server 130 (e.g., via the network 170) to be stored in the cloud database 140. Alternatively, a data source 110 may send some or all of the telemetry data directly to the cloud database 140 for storage. Various embodiments of a data source 110 and approaches to generating telemetry data are described in greater detail below, with reference to FIG. 2.

The client devices 120 are computing devices that may be used to query the cloud database 140. A client device 120 may include software with which a user may query the database. The software may be an application that generates queries locally and sends them directly to the cloud database 140 or an application (e.g., web browser) that provides access to an online interface (e.g., hosted by the management server 130) for querying the cloud database 140. In one embodiment, the software is part of a network security system and enable the user to query log data generated by managed computing devices to identify potential security threats (e.g., devices creating connections to known malicious or otherwise unauthorized network addresses). In some embodiments, a client device 120 may also be a data source 110. For example, in the network security context, a client device 120 may be a managed device that generates telemetry data and provides it to the management server 130 but also include software for querying and analyzing the telemetry data stored in the cloud database 140.

The management server 130 manages interactions between other devices in the networked computing environment 100 and the cloud database 140. The management server 130 may also manage what data is collected from the data sources 110. Alternatively, some or all of the data sources 110 may be third party sources that stream or otherwise provide data to the management server 130 for storage. In one embodiment, the management server 130 receives, aggregates, and stores data (e.g., telemetry data) received from data sources 110. The data may be stored in the cloud data base 140 as well as a permanent file store maintained by the management server 130.

The management server 130 may also process queries requesting data generated by the client devices 120. In one embodiment, the management server 130 intercepts queries intended for the cloud database 140 that are generated by client devices 120. For example, the management server 130 may sit at the edge of an enterprise network and monitor network traffic leaving the enterprise network. The management server 130 may inspect network traffic to identify queries sent to the cloud database 140 (e.g., based on the destination IP address). On identifying a query sent to the cloud database 140, the management server 130 may (at least temporarily) prevent the query from being sent to perform additional processing. Alternatively, the client devices 120 may be configured to send queries to the management server 130. For example, in one embodiment, the management server 130 may be operated by a network security service provider and provide network security functionality to more than one enterprise, each of which configures its devices to route database queries via the management server 130.

Regardless of how a query is received, the management server 130 selects a processing mode for the query based one or more parameters. In one embodiment, the management server 130 selects between a fast mode and a low-cost mode based on one or more of: user selection, a service tier of the user, a query history of the user, a predicted cost of the query using the fast mode, or a predicted number of records that will be touched by the query, etc. Various embodiments of the management server 130 and additional details of example query modes are described in greater detail below, with reference to FIG. 3.

The cloud database 140 includes one or more non-transitory storage media configured to store data (e.g., telemetry data). Although the cloud database 140 is depicted as a single entity, in practice the cloud database may be provided by multiple computing devices working together as part of a distributed database system. Thus, the cloud database 140 can provide a large and scalable amount of storage to the enterprise (or other entity) that operates the management server 130. The cloud database 140 is typically provided as a service to the enterprise by a third party. However, as noted previously, many cloud database services charge a fee based on the amount of data that may be touched by a query, rather than the amount of data returned, so querying large tables can be expensive. Note that although a cloud database 140 is described, some embodiments may use other types of data storage.

The network 170 provides the communication channels via which the other elements of the networked computing environment 100 communicate. The network 170 can include any combination of local area and wide area networks, using wired or wireless communication systems. In one embodiment, the network 170 uses standard communications technologies and protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML), extensible markup language (XML), or JavaScript® Object Notation (JSON). In some embodiments, some or all of the communication links of the network 170 may be encrypted using any suitable technique or techniques.

Figure 2:
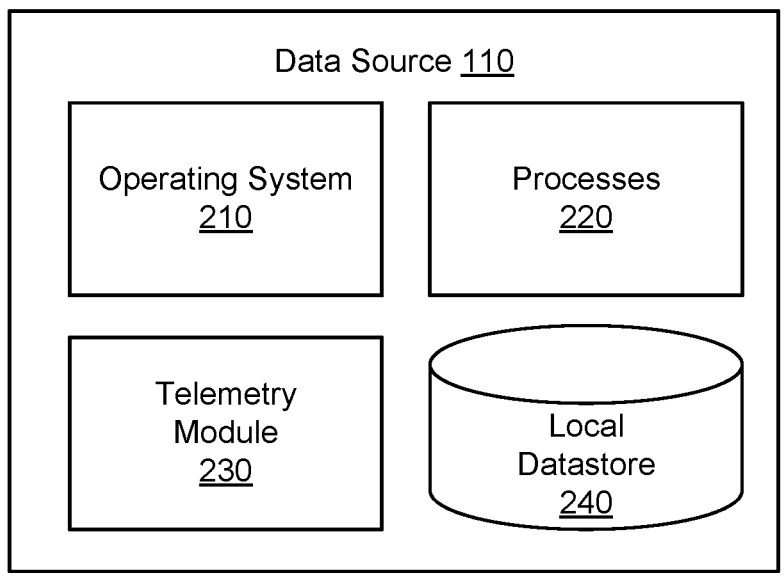
FIG. 2 is a block diagram of an example data source of FIG. 1, according to one embodiment.

FIG. 2 illustrates the software of one embodiment of a data source 110. In the embodiment shown, the data source 110 is an enterprise computing device for which the software includes an operating system 210, one or more processes 220, and a telemetry module 230. In other embodiments, the data source 110 includes different or additional elements. In addition, the functions may be distributed among elements in a different manner than described. One of skill in the art will recognize that a wide range of data sources 110 may generate a wide range of data to provide to a management server 130 for storage in a cloud database 140.

The operating system 210 is software that manages the data source's hardware and other software resources. The processes 220 are instances of computer programs being executed by the data source. The telemetry module 230 gathers telemetry data about the operation of at least some of the processes 220 and sends the telemetry data to the management server 130. In some embodiments, the telemetry module 230 uses native functionality of the operating system 210 to gather telemetry data (e.g., rather than kernel mode drivers) enabling the telemetry module 230 to have a small footprint on the data source 110. This may be valuable to reduce the computational resources expended in monitoring the behavior of the processes 220, particularly for data sources with relatively limited processing power or memory.

In the use case where the management server 130 is part of a network security system, the telemetry data may include a log of what processes 220 are executing, any network connections opened and the IP address/port connected to by a process, the number of packets sent through a network connection, the number of network packets received from a connection, and the like. The telemetry module 230 may also supplement the telemetry data with additional contextual information. In one embodiment, in addition to recording an IP address the data source 110 connects to, the telemetry module 230 also determines what information was included in a corresponding DNS lookup and records the domain name that the process 220 tried to connect to in conjunction with the IP address. This may be useful in identifying attacks on the network because performing a DNS lookup after the fact is unlikely to uncover the actual domain name that the process 220 tried to communicate with. For example, it is not uncommon in network attacks for the domain name used to be changed every minute to try and conceal the source of the attack. Additionally or alternatively, additional information about the data source 110 may be included in the telemetry data, such as the geolocation of the data source 110, current system configuration, and the like.

Figure 3:
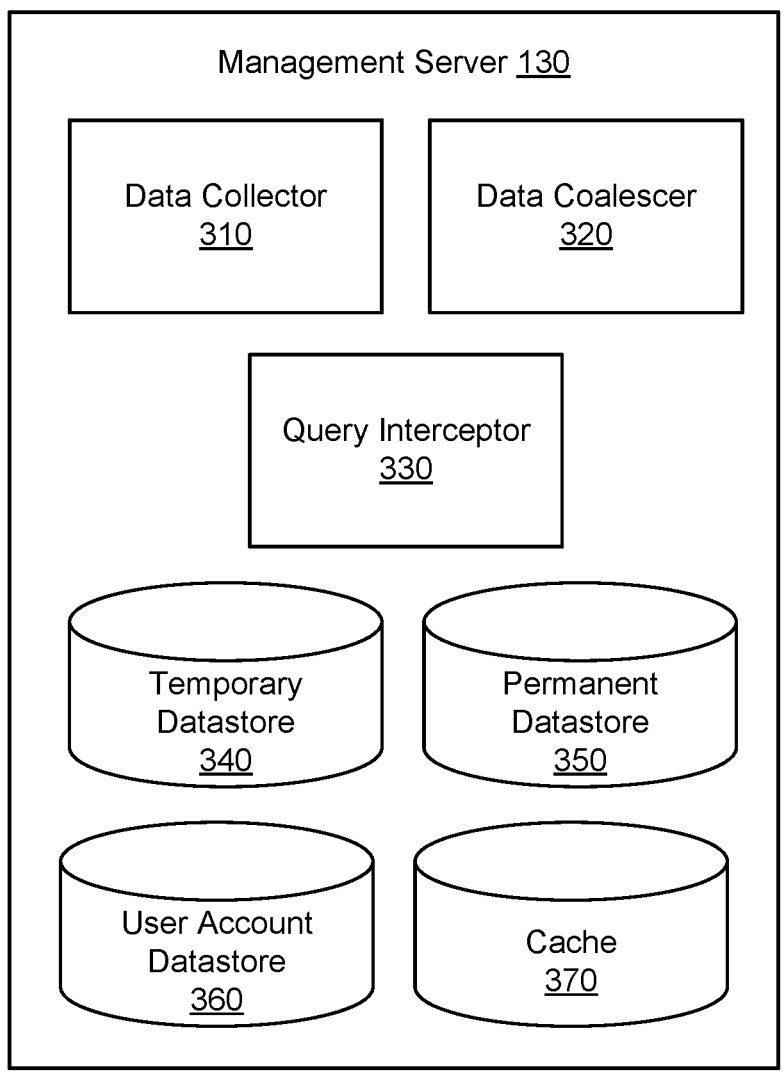
FIG. 3 is a block diagram of the management server shown in FIG. 1, according to one embodiment.

FIG. 3 illustrates one embodiment of the management server 130. In the embodiment shown, the management server 130 includes a data collector 310, a data coalescer 320, a query interceptor 330, a temporary datastore 340, a permanent datastore 350, a user account datastore 360, and a cache 370. In other embodiments, the management server 130 includes different or additional elements. In addition, the functions may be distributed among elements in a different manner than described.

The data collector 310 receives data (e.g. telemetry data) from the data sources 110 and stores the received data for further processing. In various embodiments, the data collector 310 saves the received data to temporary files in the temporary datastore 340 using a record-oriented format, with each temporary file potentially containing numerous records. More than one data collector processes may run in parallel, each saving data to the temporary files in the temporary datastore 340.

Depending on the data source 110, the data may be streamed to the data collector 310 or sent in batches. For example, a first data source may be configured to automatically stream new data to the data collector 310 when the new data is generated while a second data source may be configured to provide batches of data on a schedule (e.g., once every five minutes, once an hour, once a day, at a specified time on weekdays, weekly, etc.). A batch may include data generated by the data source 110 since a previous batch was sent to the data collector 310. The transfer of data from a data source 110 to the data collector 310 may be initiated as a push operation by the data source or a pull operation by the data collector, depending on the embodiment. For streaming data sources 110, the data collector 310 may divide the steamed data into pseudo-batches by saving streamed data for a predetermined time period (e.g., thirty seconds or one minute), predetermined size (e.g., one gigabyte or one million records), or some combination of both (e.g., starting a new temporary file if a predetermined time threshold or predetermined size threshold is met, whichever occurs first).

In one embodiment, the data collector 310 maintains a list of computing devices that are providing data. In addition to receiving data (e.g., data generated by a telemetry module 230) from the computing devices for storage in the cloud database 140, the data collector may periodically (e.g., on a daily or weekly heartbeat) receive metadata describing aspects of the computing devices. For example, the metadata received from a computing device may indicate any configuration changes made since the computing device previously provided metadata. The data collector 310 may also push updates to the computing devices on the list (e.g., configuration updates for the telemetry module 230 that modify what data is collected and sent to the data collector 310).

The data coalescer 320 processes the temporary files created by the data collector 310 to reduce the total number of files. This can improve the performance of queries performed later on the data. In various embodiments, the data coalescer 320 receives a notification when a new temporary file is added to the temporary file store 340 and processes the newly-added temporary file. In one embodiment, the data coalescer 320 processes a temporary file by reading the records from the temporary file, supplementing the records with index metadata indicating locations of the records, and writes the supplemented records to a current record file. The index metadata may include a path and an offset. The path uniquely maps to name of the current record file and the offset indicates the location of the record in the current record file (e.g., by byte count or record number).

When one or more conditions are met, the data coalescer 320 stores the current record file (e.g., in the permanent datastore 350) and starts a new record file. Example conditions include: the size of the current record file exceeding a predetermined file-size limit, the number of records in the current record file exceeding a predetermined record-count limit, and the time since the current record file was last written to exceeding a predetermined write-time limit. The data coalescer also loads the content (including the index metadata) of the current record file into a table in the cloud database 240. Thus, the records loaded into the table include the location of the corresponding records in the permanent datastore 350.

The query interceptor 330 receives and processes queries of the cloud database 140 sent from client devices 120. As described previously, the query interceptor 330 may inspect network traffic (e.g., packets leaving an enterprise network) to identify and intercept queries or client devices 120 may be configured to route queries via the query interceptor 330. The query interceptor 330 may select a mode for a query in response to receiving the query. In one embodiment, the mode is selected based on parameters of: the query (e.g., an estimated cost of running the query on the cloud database 140), the user that sent the query (e.g., a user-selection of what mode to use sent with the query, a service tier of the user, or a query history of the user), or both. In another embodiment, the query mode may be selected based on a current day or time at which the query is received. For example, queries received during an off peak period (e.g., between 8 pm and 7 am) may be processed using a fast mode automatically, while the query interceptor 330 may select between the fast mode or a cheap mode for queries received during a peak period (e.g., between 7 am and 8 pm) based on a service tier of the user. In a further embodiment, the query interceptor 330 may consider the query histories of multiple users in a group to determine which mode to use. For example, all of the users within an enterprise may share a weekly budget for fast-mode queries and whether a given query is processed using the fast mode may depend on how much of the weekly budget has been used by the enterprise at the time the given query is received.

In various embodiments, the query interceptor 330 selects between using a fast query mode and a low-cost query mode. In the fast query mode, the query interceptor 330 executes the query on the cloud database 140, which returns responsive results to the client device 120 that initiated the query (either directly or via the query interceptor 330). Thus, the fast query mode essentially executes the query on the cloud 140 database as if the query interceptor 330 were not present. Consequently, the fast query mode gains the advantages of any query optimization provided by the cloud database, but may incur significant cost if a large amount of data is touched by the query (e.g., a query that looks for responsive results in all of a large table).

In contrast, in the low-cost query mode, the query interceptor 330 queries the cloud database 140 for a limited number of fields of matching records sufficient to identify the matching records. In one embodiment, the query interceptor 330 requests only the paths and offsets of matching records from the cloud database 140 and uses the returned paths to retrieve the corresponding record files from the permanent datastore 350 and the returned offsets to extract the matching records from the record files. The query interceptor 330 may return the results retrieved using the low-cost method in the same format as would have been obtained using the fast method. Thus, which query mode is used can be transparent to the querying client device 120.

To improve the speed of the low-cost mode, the query interceptor 330 may store record files retrieved from the permanent datastore 350 in a cache 370. Thus, if a record file identified by a path received from the cloud database 140 in response to a low-cost mode query is available in the cache 370, the query interceptor 330 need not retrieve it from the permanent datastore 350. In one embodiment, record files are stored in the permanent datastore 350 in a compressed format and the query interceptor 330 decompresses the record files for storage in the cache 370. Some files (e.g., files under 100 MB) may be recompressed using a compression algorithm that is optimized for speed of access rather than compression ratio (e.g., the LZ4 compression algorithm). If the percentage of the cache 370 currently in use exceeds a first threshold, additional record files (e.g., those over 100 MB in size) may also be compressed using the compression algorithm that is optimized for speed of access. If the percentage of the cache 370 exceeds a second threshold, even after the compression of additional record files, then cached record files may be deleted using any appropriate method to select which to delete first (e.g., by ranking the cached files based on one or more of: the number of records read from a file relative to the file's total size, the total size of the file, then amount of time since the file was last read from, and the amount of time the file has been in the cache 370).

The speed and cost of the low-cost mode can be balanced by assigning more or less computational resources to the query interceptor 330 for performing low-cost mode queries. For example, the speed of the low-cost mode may be improved by allocating more CPU, memory, or temporary disk resources (e.g., to allow it to perform multiple retrieval operations in parallel). In contrast, the cost of the low-cost mode may be reduced at the expense of slower query speeds by decreasing the amount of allocated computational resources. In some embodiments, multiple query interceptors 330 may be deployed to either handle queries from multiple users or improve reliability in the case of failure, or both.

In one embodiment, the query interceptor 330 selects between the fast mode and the low-cost mode based on an indication of the user that sent the query. The indication of the user may be an IP address of the client device 120 from which the query was received, an identifier of the client device 120 from which the query was received (e.g., a MAC address), metadata packaged with the query identifying the user (e.g., a user ID), or any other suitable indication of the identity of the user that sent the query. In some embodiments, the query interceptor 330 may check that the user is authenticated, authorized to make the query, or both, using an suitable techniques.

Assuming the user is authorized (or if authorization is not required), the query interceptor 330 retrieves information about the user (e.g., from the user account datastore 360) and selects the query mode based on the retrieved information about the user. For example, users may be offered different tiers of subscription to the query service provided by the management server 130. Users subscribed to the highest tier might have all of their queries processed using the fast mode, while intermediate tier users might get a limited number of fast mode queries in a given time period (e.g., each month) before the low-cost mode is used for those users' queries, and queries from users in a lowest tier might always use the low-cost mode. Additionally or alternatively, the user may select which query mode to use when sending the query (and an indication of the selected mode is then provided to the query interceptor 330 with the query) and the query interceptor 330 defaults to the selected mode (but may still use another mode in certain circumstances, such as if a user selects the fast mode but the user's query history indicates the user has already used the number of fast queries allowed by the user's subscription tier).

In another embodiment, the query interceptor 330 dynamically determines which query mode to use based on aspects of the query. For example, the query interceptor 330 may estimate the cost of the query if the fast mode is used. Cloud database providers typically provide a "dry run" function where a query is provided and the cloud database 140 returns an estimate of the volume of data that will be queried (and thus an estimate of the cost) without providing the results. The estimates are not always precise, but the cloud database provider typically does not charge for the dry run. The query interceptor 330 may then select which query mode to use based on the estimated cost from the dry run. For example, the query interceptor 330 may select the fast mode if the estimated cost is below a threshold and use the low-cost mode otherwise. As another example, the query interceptor 330 may keep a running tally of a user's query costs over a given time period (e.g., monthly costs) and use the fast mode if a query if the estimated cost of the query will not take the user's total cost for the given time period over a threshold. The thresholds for individual query cost and aggregated cost over a given time period may be set globally, tied to a user's tier, selected individually by the user, or set in any other suitable manner.

In a further embodiment, the query interceptor 330 selects the query mode using a machine-learning model (e.g., a neural network, decision tree, or support-vector machine, etc.). The model may be trained using historical queries paired with indications of what query mode was used for each or artificial training data created by human labelers indicating which query mode should be used for each query in a training set (the queries in the training set may either be historical queries or artificially created queries). Regardless of the specific training approach used, the model is trained to generate predictions of whether the fast or low-cost mode should be used for any given query. The query interceptor 330 may use the predicted mode for queries received from some or all of the client devices 120. Alternatively, the model may also generate a likelihood score indicating a probability that the prediction is correct. If the likelihood score for a prediction exceeds a threshold, the query interceptor 130 may automatically use the predicted mode. Otherwise, the query interceptor 130 may present the predicted mode to the user that initiated the query for confirmation of which mode should be used. The confirmation provided by the user may be used as additional training data to retrain the model to generate more reliable predictions.

The temporary datastore 340, permanent datastore 350, user account datastore 360, and cache 370 each include one or more non-transitory storage media configured to store data used by the management server 130. The capacity, type, and configuration of the storage media may differ in view of the purpose of the datastore in question. For example, the cache 370 may be a flash memory configured to high-speed access but having a relatively small capacity. In contrast, the permanent datastore 350 may be an array of magnetic drives or other long-term storage devices that are selected to provide relatively low-cost, reliable long-term data storage. Although the permanent datastore 350 is shown as part of the management server 130, it should be appreciated that it may be physically separate from the other components of the management server 130 and accessed via a network or other data connection (e.g., the network 170). Furthermore, it should be appreciated that the term "permanent" is used for convenience to express that the permanent data store 350 retains files for an extended period of time (e.g., longer than the temporary datastore 340 or the cache 370). It should not be understood to require that the permanent datastore 350 retains files indefinitely. One of skill in the art will recognize numerous options for the capacity, type, and configuration of each of the datastores depicted in FIG. 3.

Example Methods

Figure 4:
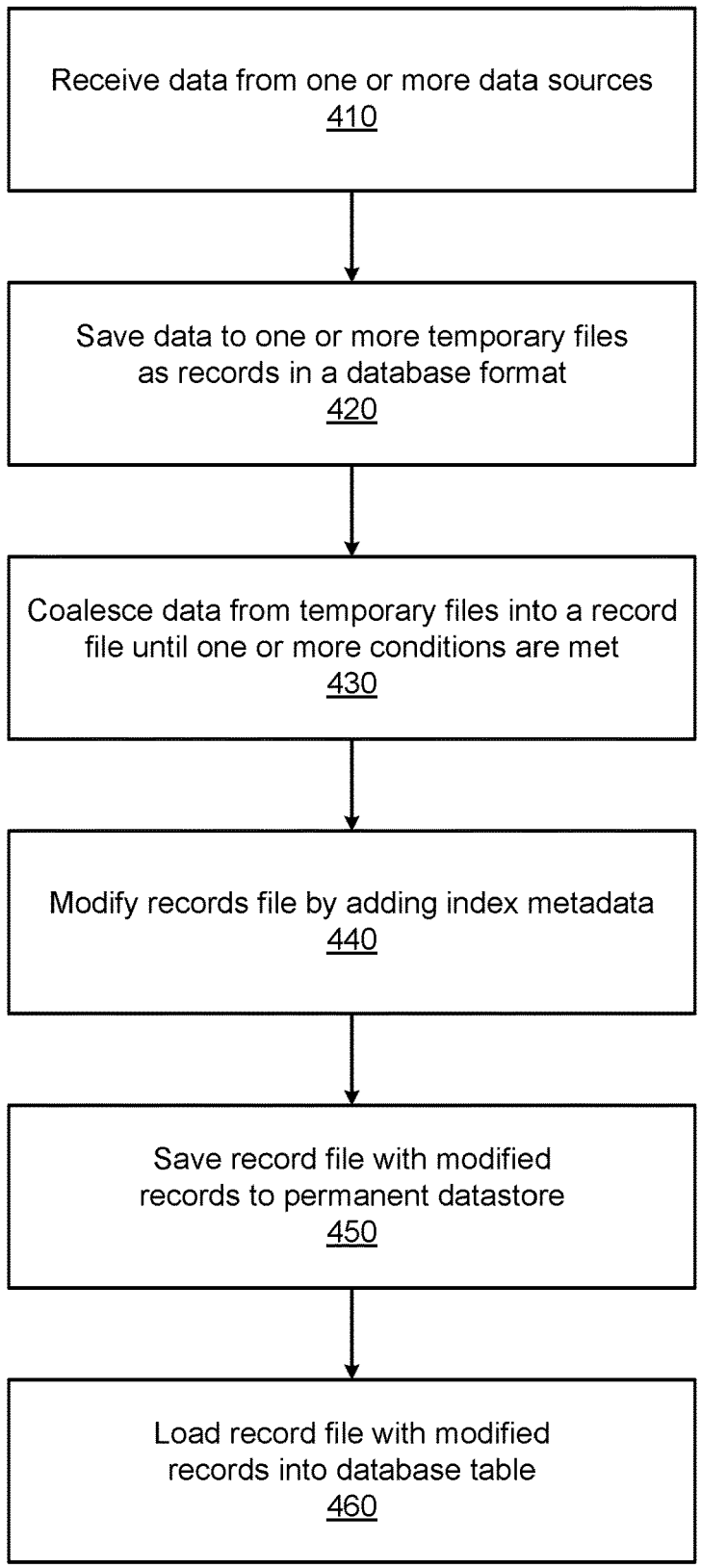
FIG. 4 is a flowchart of a method for saving data to permanent datastore and a database, according to one embodiment.
Figure 5:
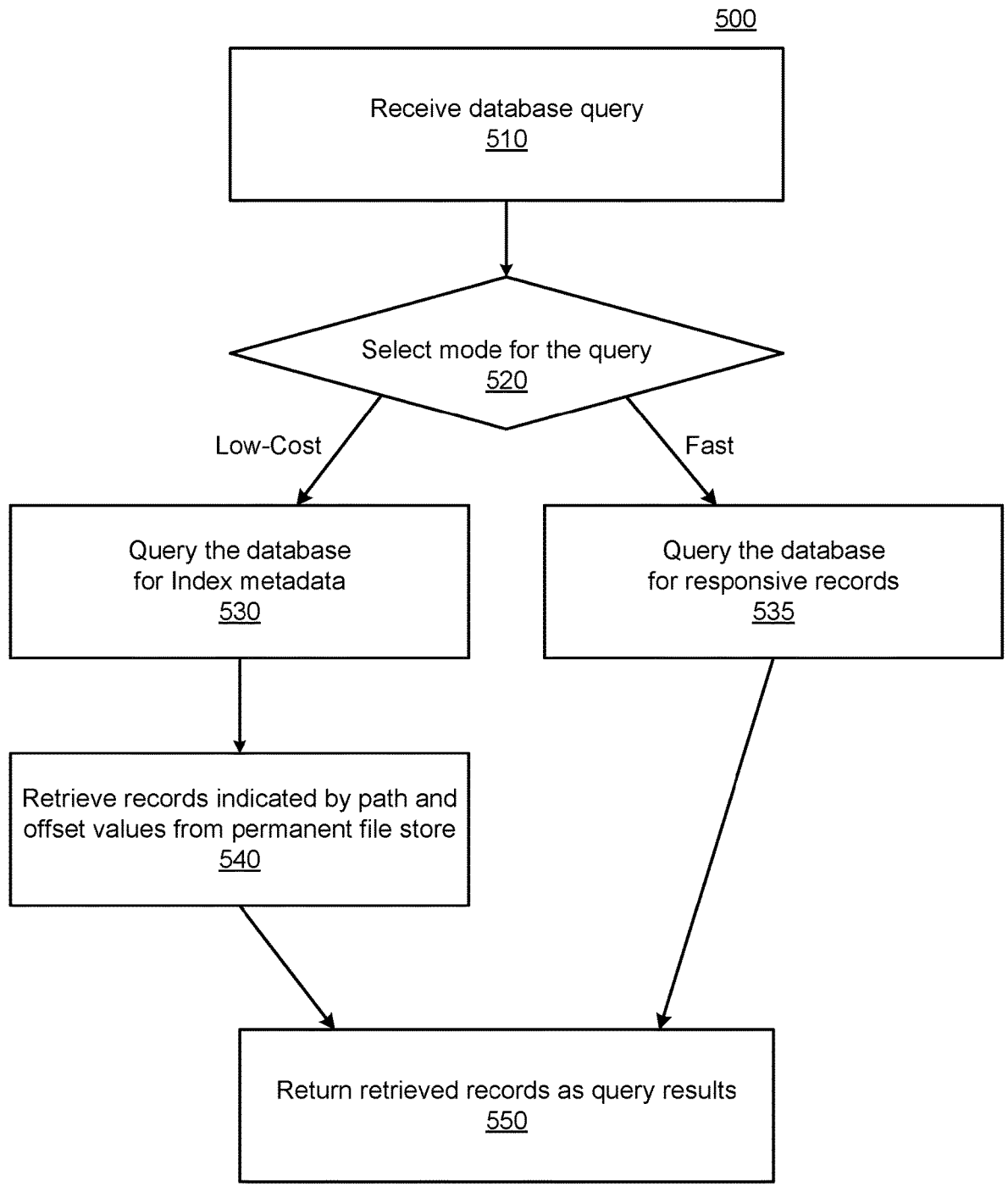
FIG. 5 is a flowchart of a method for querying a database using run-time mode selection, according to one embodiment.

FIGS. 4 and 5 illustrate example methods for storing and retrieving data from a cloud database 140, according to one embodiment. The steps of the methods are illustrated from the perspective of various components of the management server 130 performing the methods. However, some or all of the steps may be performed by other entities or components. In addition, some embodiments may perform the steps in parallel, perform the steps in different orders, or perform different steps.

FIG. 4 is illustrates an example method 400 for saving data to a permanent datastore 350 and a cloud database 140. In the embodiment shown, the method 400 begins with the data collector 310 receiving 410 data from one or more data sources 110. The data sources 110 can provide data in streams, batches, or a combination of both. The data collector 310 processes the data to generate records in a database format and saves 420 the formatted data to one or more temporary files.

The data coalescer 320 coalesces 430 the data records from the temporary files into a current record file until one or more conditions are met. The conditions may include the size of the current record file exceeding a predetermined file-size limit, the number of records in the current record file exceeding a predetermined record-count limit, and the time since the current record file was last written to exceeding a predetermined write-time limit, etc. The data coalescer 320 modifies 440 the records in the current record file by adding index metadata. For example, the data coalescer 320 can add a path identifying the current record file and an offset indicating the location of the record in the current record file to each record. The data coalescer 310 may modify the records before writing the records to the current record file or add the index metadata to the records after the records have been written to the current record file.

The data coalescer 320 saves 450 the record file (including the added index metadata) to the permanent datastore 350. The data coalescer 320 also loads 460 the record file (including the added index metadata) to a table in the cloud database 140. Alternatively, the version of the record file saved 450 in the permanent datastore 350 may omit the added index metadata. This involves additional processing power at data ingestion time but slightly reduces the amount of data stored in the permanent datastore 350, which may be desirable if storage space is limited.

FIG. 5 illustrates an example method 500 for querying a database using run-time mode selection. In the embodiment shown, the method 500 begins with the query interceptor 330 receiving 510 a database query from a client device 120. The query interceptor 330 selects 520 a mode for the query. For example, the query interceptor 330 may select 520 to use either a fast mode or a low-cost mode to process the query based on one or more parameters. The parameters may include a user selected mode, a service tier of the user, a query history of the user, or a predicted cost of the query using the fast mode, etc. Additionally or alternatively, the query interceptor 330 may use a machine-learning model to select 520 which query mode to use.

The query interceptor 330 generates a query to send to the cloud database 140 based on the selected mode. In one embodiment, if the fast mode is selected 520, the query interceptor 330 queries 535 the cloud database 140 for responsive records. In other words, the query generated by the query interceptor 330 essentially forwards the original query received from the client device 120 to the cloud database 140 unmodified. In contrast, if the low-cost mode is selected 520, the query interceptor 330 queries 530 the cloud database 140 for the index metadata (e.g., path and offset) of responsive records. The query interceptor 330 retrieves 540 the responsive records indicated by the index metadata from the permanent datastore 350. For either query mode, the query interceptor 330 returns 550 the responsive records to the client device 120 from which the query was received 510.

Computing System Architecture

Figure 6:
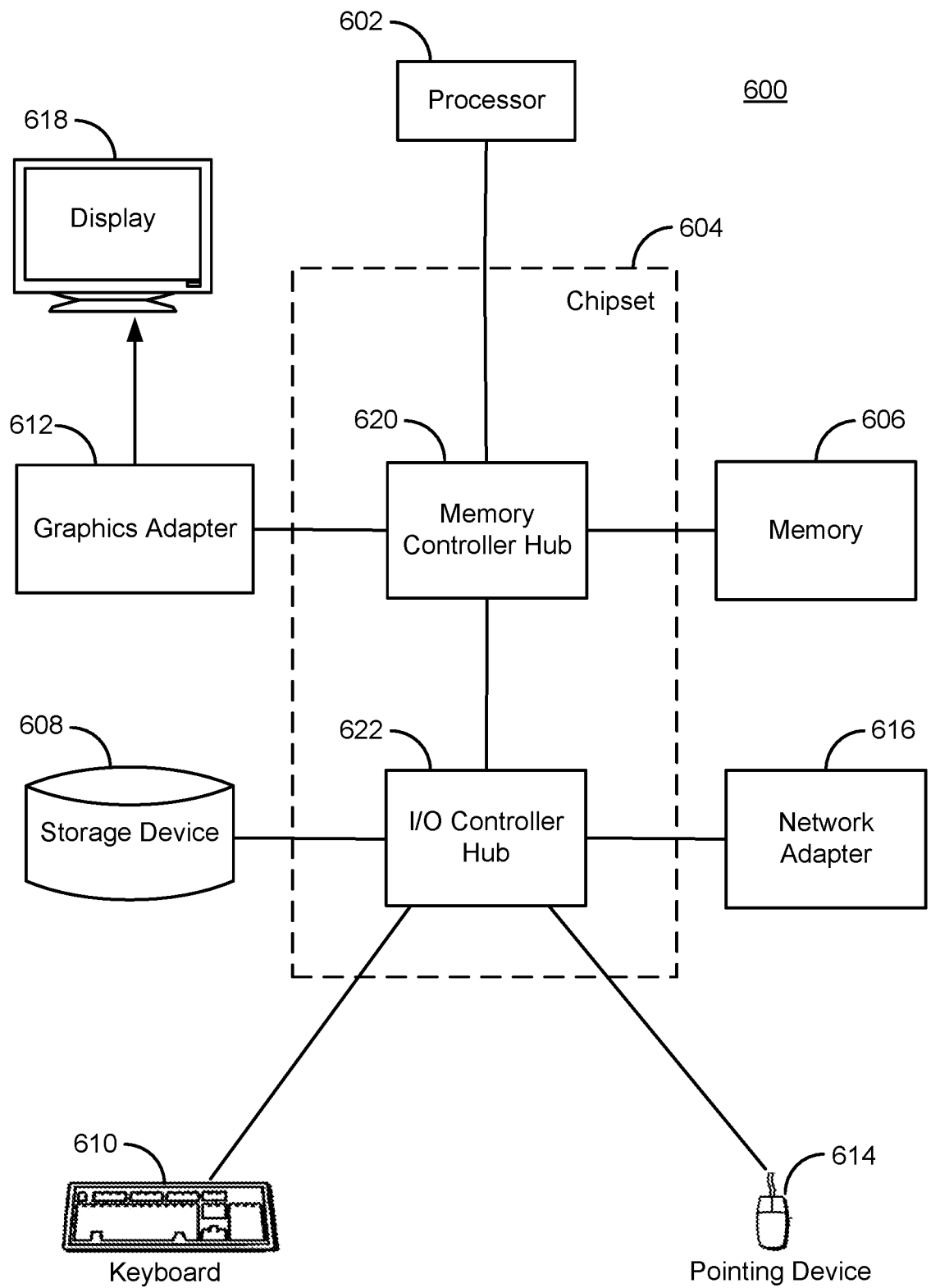
FIG. 6 is a block diagram illustrating an example of a computer suitable for use in the networked computing environment of FIG. 1, according to one embodiment.

FIG. 6 illustrates an example computer 600 suitable for use as a data source 110, client device 120, or management server 130. The example computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touch-screen, or other type of pointing device, and is used in combination with the keyboard 610 (which may be an on-screen keyboard) to input data into the computer system 600. The graphics adapter 612 displays images and other information on the display 618. The network adapter 616 couples the computer system 600 to one or more computer networks.

The types of computers used by the entities of FIGS. 1 through 3 can vary depending upon the embodiment and the processing power required by the entity. For example, the management server 130 might include multiple blade servers working together to provide the functionality described. Furthermore, the computers can lack some of the components described above, such as keyboards 610, graphics adapters 612, and displays 618.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing a database with run-time query mode selection. Thus, while particular embodiments and applications have been illustrated and described, it is to be understood that the described subject matter is not limited to the precise construction and components disclosed. The scope of protection should be limited only by the following claims.

What is claimed is:

1. A computer-implemented method of processing database queries, the method comprising:
    receiving, from a client device, a first query;
    selecting a low-cost mode for processing the first query from a plurality of possible modes, the plurality of possible modes including a fast mode and the low-cost mode;
    processing the first query according to the low-cost mode to generate first query results, wherein processing the first query according to the low-cost mode comprises:
        querying a cloud database for index metadata of records that are responsive to the first query;
        receiving, from the cloud database, the index metadata of records that are responsive to the first query; and
        retrieving, using the index metadata, the records that are responsive to the first query from a datastore other than the cloud database; and
    providing the first query results to the client device.

2. The computer-implemented method of claim 1, further comprising:
    receiving a second query;
    selecting thefast mode to process the second query;
    processing the second query according to the fast mode to generate second query results, wherein processing the second query according to the fast mode comprises:
        forwarding the second query to a cloud database; and
        receiving the second query results from the cloud database; and
    providing the second query results in response to the second query.

3. The computer-implemented method of claim 2, wherein the mode for processing the second query is selected by estimating a cost to process the second query using the fast mode and, responsive to the cost being below a cost threshold, selecting the fast mode to process the second query.

4. The computer-implemented method of claim 1, wherein the index metadata for a responsive record includes a path and an offset, the path identifying a file in the datastore that includes the responsive record and the offset indicating a location of the responsive record in the file.

5. The computer-implemented method of claim 1, wherein records including the responsive record were added to the datastore and the cloud database by a process comprising:
    receiving data from one or more data sources;
    generating the records based on the received data;
    adding the records to a current record file;
    adding the index metadata to the records;
    saving the current record file to the datastore; and
    loading the records in the current record file into a table in the cloud database.

6. The computer-implemented method of claim 5, wherein the process for adding records to the datastore and the cloud database further comprises:
    after adding the records to the current record file, determining whether one or more conditions are met; and
    responsive to the one or more conditions being met, starting a new record file,
    wherein the current record file is saved to the datastore and loaded into the table responsive to the one or more conditions being met.

7. The computer-implemented method of claim 1, further comprising identifying a user that initiated the first query, wherein the mode for processing the first query is selected based on at least one of: a query mode selected by the user, a service tier of the user, or a query history of the user.

8. The computer-implemented method of claim 1, further comprising identifying a user that initiated the first query, wherein the mode for processing the first query is selected using a process including:
   estimating a cost to process the first query using the fast mode;
   incrementing a tally of query costs incurred by the user in a given time period by the estimated cost; and
   selecting the low-cost mode responsive to the incremented tally of query costs for the given time period exceeding a threshold.

9. Computer-implemented method of claim 1, wherein the mode for processing the first query is selected by applying a machine-learning model to data associated with the first query.

10. The method of claim 1, wherein the datastore comprises a permanent datastore and a cache, and retrieving the responsive records comprises:
   responsive to determining a first record of the responsive records is available in the cache, retrieving the first record from the cache;
   responsive to determining a second record of the responsive records is unavailable from the cache, retrieving the second record from the permanent datastore; and
   storing the second record in the cache.

11. The method of claim 10, wherein the second record is stored in the permanent datastore in a compressed format, the method further comprising:
   decompressing the second record before storing the second record in the cache;
   determining a percentage of the cache currently in use; and
   responsive to the precentage of the cache exceeding a first threshold, recompressing the second record.

12. A non-transitory computer-readable storage medium storing instructions for processing database queries, the instructions, wherein executed by a computing system, causing the computing system to perform operations comprising:
   receiving, from a client device, a first query;
   selecting a low-cost mode for processing the first query from a plurality of possible modes, the plurality of possible modes including a fast mode and the low-cost mode;
   processing the first query according to the low-cost mode to generate first query results, wherein processing the first query according to the low-cost mode comprises:
      querying a cloud database for index metadata of records that are responsive to the first query;
      receiving, from the cloud database, the index metadata of records that are responsive to the first query; and
      retrieving, using the index metadata, the records that are responsive to the first query from a datastore other than the cloud database; and
   providing the first query results to the client device.

13. The non-transitory computer-readable storage medium of claim 12, wherein the operations further comprise:
   receiving a second query;
   selecting the fast mode to process the second query;
   processing the second query according to the fast mode to generate second query results, wherein processing the second query according to the fast mode comprises:
      forwarding the query to a cloud database; and
      receiving the query results from the cloud database; and
   providing the second query results in response to the second query.

14. The non-transitory computer-readable storage medium of claim 13, wherein the mode for processing the second query is selected by estimating a cost to process the second query using the fast mode and, responsive to the cost being below a cost threshold, selecting the fast mode to process the second query.

15. The non-transitory computer-readable storage medium of claim 12, wherein the index metadata for a responsive record includes a path and an offset, the path identifying a file in the datastore that includes the responsive record and the offset indicating a location of the responsive record in the file.

16. The non-transitory computer-readable storage medium of claim 12, wherein the operations further comprise identifying a user that initiated the query, and the mode for processing the first query is selected based on at least one of: a query mode selected by the user, a service tier of the user, or a query history of the user.

17. The non-transitory computer-readable storage medium of claim 12, wherein the operations further comprise identifying a user that initiated the query, and the mode for processing the first query is selected using a process including:
   estimating a cost to process the first query using the fast mode;
   incrementing a tally of query costs incurred by the user in a given time period by the estimated cost; and
   selecting the low-cost mode responsive to the incremented tally of query costs for the given time period exceeding a threshold.

18. The non-transitory computer-readable storage medium of claim 12, wherein the mode for processing the first query is selected by applying a machine-learning model to data associated with the first query.

19. The non-transitory computer-readable storage medium of claim 12, wherein the datastore comprises a permanent datastore and a cache, and retrieving the responsive records comprises:
   responsive to determining a first record of the responsive records is available in the cache, retrieving the first record from the cache;
   responsive to determining a second record of the responsive records is unavailable from the cache, retrieving the second record from the permanent datastore; and
   storing the second record in the cache.

20. The non-transitory computer-readable storage medium of claim 19, wherein the second record is stored in the permanent datastore in a compressed format, the method further comprising:
   decompressing the second record before storing the second record in the cache;
   determining a percentage of the cache currently in use; and
   responsive to the precentage of the cache exceeding a first threshold, recompressing the second record.

* * * * *